US012794763B2

(12) United States Patent
Sharma et al.

(10) Patent No.: US 12,794,763 B2
(45) Date of Patent: Nov. 10, 2026

(54) INHIBITING EXCESSIVE DATA SYSTEM SIGNALING IN A WIRELESS COMMUNICATION NETWORK

(71) Applicant: T-MOBILE INNOVATIONS LLC, Overland Park, KS (US)

(72) Inventors: Anuj Sharma, Broadlands, VA (US); Deepesh Belwal, Ashburn, VA (US); Anil Kumar Mariyani, Ashburn, VA (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 320 days.

(21) Appl. No.: 18/390,733

(22) Filed: Dec. 20, 2023

(65) Prior Publication Data

US 2025/0211479 A1 Jun. 26, 2025

(51) Int. Cl.
*H04L 41/0659* (2022.01)
*H04L 41/12* (2022.01)

(52) U.S. Cl.
CPC .......... *H04L 41/0659* (2013.01); *H04L 41/12* (2013.01)

(58) Field of Classification Search
None
See application file for complete search history.

(56) References Cited

U.S. PATENT DOCUMENTS 10,979,322 B2* 4/2021 Kulshreshtha .......... H04L 47/28
11,716,646 B2 8/2023 Yao et al.
2003/0158940 A1* 8/2003 Leigh .................... H04L 67/101 718/105
2014/0153924 A1* 6/2014 deRuijter ............. H04B 10/275 398/58
2016/0226758 A1* 8/2016 Ashwood-Smith ..... H04L 45/22
2016/0342588 A1* 11/2016 Judd ..................... G06F 16/137
2020/0026615 A1* 1/2020 Bagchi ................ G06F 11/1451
2020/0026622 A1* 1/2020 Bagchi ................ G06F 11/3006
2021/0021494 A1 1/2021 Yao et al.
2021/0022024 A1 1/2021 Yao et al.
2021/0105295 A1* 4/2021 Smith ................... H04L 63/101
2022/0166695 A1* 5/2022 Iglesias ............... H04L 67/1034
2022/0182923 A1 6/2022 Yao et al.
2022/0303753 A1* 9/2022 Zhu ......................... H04W 8/08
2022/0417122 A1 12/2022 Chou et al.
2023/0078778 A1* 3/2023 Kuravangi-Thammaiah ............... H04W 8/18 455/418
2023/0247521 A1* 8/2023 Zhu ................... H04W 36/0055
(Continued)

*Primary Examiner* — Suk Jin Kang

(57) ABSTRACT

Various embodiments comprise a wireless communication network to inhibit network data system signaling overload. In some examples, the wireless communication network comprises primary Unified Data Registry (UDR) and secondary UDRs. The primary UDR node detects a fault condition for a secondary UDR. The primary UDR node blacklists the secondary UDR node for inter-UDR communications based on the fault condition and updates a network topology graph to remove the secondary UDR node. The primary UDR node transfers a command to another secondary UDR to blacklist the secondary UDR node and to update the network topology graph to remove the secondary UDR node. The other secondary UDR node receives the command, blacklists the secondary UDR node for inter-UDR communications, and updates the network topology graph to remove the secondary UDR node.

20 Claims, 13 Drawing Sheets

(56) References Cited

U.S. PATENT DOCUMENTS

| | | | | |
|---|---|---|---|---|
| 2024/0056395 | A1* | 2/2024 | Abdelmalek | H04L 47/2475 |
| 2024/0057010 | A1* | 2/2024 | Minokuchi | H04W 60/04 |
| 2024/0064622 | A1* | 2/2024 | Bartolomé Rodrigo | H04W 24/02 |
| 2024/0107333 | A1* | 3/2024 | Chenumolu | H04L 41/0895 |
| 2024/0113944 | A1* | 4/2024 | Wu | H04L 41/12 |
| 2024/0195893 | A1* | 6/2024 | Song | H04W 8/30 |
| 2024/0196193 | A1* | 6/2024 | Kuravangi-Thammaiah | H04W 8/20 |
| 2024/0205859 | A1* | 6/2024 | Hoffner | H04W 8/20 |
| 2024/0244421 | A1* | 7/2024 | Kuravangi-Thammaiah | H04W 8/18 |
| 2024/0323092 | A1* | 9/2024 | Kuravangi-Thammaiah | H04L 41/122 |
| 2025/0080994 | A1* | 3/2025 | Chenumolu | H04W 16/18 |
| 2025/0142317 | A1* | 5/2025 | Sharma | H04W 24/04 |
| 2025/0158891 | A1* | 5/2025 | Kuravangi-Thammaiah | H04L 41/122 |
| 2025/0298787 | A1* | 9/2025 | Kondiles | G06F 16/2343 |
| 2025/0342129 | A1* | 11/2025 | Galvin | G06F 13/20 |

* cited by examiner

INHIBITING EXCESSIVE DATA SYSTEM SIGNALING IN A WIRELESS COMMUNICATION NETWORK

TECHNICAL FIELD

Various embodiments of the present technology relate to wireless communication network data systems, and more specifically, to inhibiting excessive data system signaling in response to data system faults.

BACKGROUND

Wireless communication networks provide wireless data services to wireless user devices. Exemplary wireless data services include voice calling, video calling, internet-access, media-streaming, online gaming, social-networking, and machine-control. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices. Exemplary network functions include Access and Mobility Management Function (AMF), Policy Control Function (PCF), and Unified Data Management (UDM).

Unified Data Registry (UDR) is a Fifth Generation Core (5GC) network entity that stores network and subscriber data. The subscriber data into organized into subscriber profiles that each correspond to a wireless user device subscribed for service on the network. The subscriber profiles store data like service attributes, network policy authorizations, mobility policies, and the like. The subscriber profiles are associated with the user devices based on device Identifiers (IDs) like International Mobile Subscriber Identity (IMSI). When another network function (e.g., UDM) needs to retrieve subscriber data to serve a user device, the network function accesses the subscriber profile stored by the UDR that is associated with that user device. The network function then serves the user device based on the retrieved subscriber data.

Some UDRs employ a multi-node configuration. In a multi-node configuration, the UDR comprises a primary node and a number of secondary nodes that store replicas of the data held by the primary node. The primary and secondary nodes may serve subscriber data to, and implement updates received from the other network functions in the 5GC. The primary and secondary nodes exchange synchronization signaling with each other to ensure the replica data stored in the secondary nodes matches the data stored in the primary node. When hardware or software faults occur in the UDR nodes, the nodes may become desynchronized (e.g., the data stored by a first UDR node does not match the data stored by a second UDR node). When a network function attempts to write an update to a desynchronized UDR node, the update fails since the desynched data does not match the data that is to be updated. To attempt to overcome the update failure, the network function sends retry requests to the desynched UDR. The amount of retry requests may be excessive. This excessive signaling adversely affects the other nodes of the UDR.

Unfortunately, UDRs do not efficiently determine when one or more UDR nodes become desynchronized. Moreover, the UDR nodes do not effectively inhibit the excessive signaling that results from UDR node desynchronization.

OVERVIEW

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for data system management. Some embodiments comprise a method of operating a wireless communication network to inhibit network data system signaling overload. The method comprises a primary Unified Data Registry (UDR) node detecting a fault condition for a secondary UDR node. The method further comprises the primary UDR node blacklisting the secondary UDR node for inter-UDR communications based on the fault condition and updating a network topology graph to remove the secondary UDR node. The method further comprises the primary UDR node transferring a command to another secondary UDR to blacklist the secondary UDR node and to update the network topology graph to remove the secondary UDR node. The method further comprises the other secondary UDR node receiving the command, blacklisting the secondary UDR node for the inter-UDR communications, and updating the network topology graph to remove the secondary UDR node.

Some embodiments comprise a wireless communication network to inhibit network data system signaling overload. The wireless communication network comprises a primary Unified Data Registry (UDR) node and secondary UDR nodes. The primary UDR node detects a fault condition for a secondary UDR node. The primary UDR node blacklists the secondary UDR node for inter-UDR communications based on the fault condition and updates a network topology graph to remove the secondary UDR node. The primary UDR node transfers a command to another secondary UDR to blacklist the secondary UDR node and to update the network topology graph to remove the secondary UDR node. The other secondary UDR node receives the command, blacklists the secondary UDR node for inter-UDR communications, and updates the network topology graph to remove the secondary UDR node.

Some embodiments comprise one or more non-transitory computer readable storage media having program instructions stored thereon to inhibit network data system signaling overload. When executed by a computing system, the program instructions direct the computing system to perform operations. The operations comprise detecting a fault condition for a secondary UDR node. The operations further comprise blacklisting the secondary UDR node for inter-UDR communications based on the fault condition. The operations further comprise updating a network topology graph to remove the secondary UDR node. The operations further comprise transferring a command to another secondary UDR to blacklist the secondary UDR node and to update the network topology graph to remove the secondary UDR node. The other secondary UDR node receives the command, blacklists the secondary UDR node for the inter-UDR communications, and updates the network topology graph to remove the secondary UDR node.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
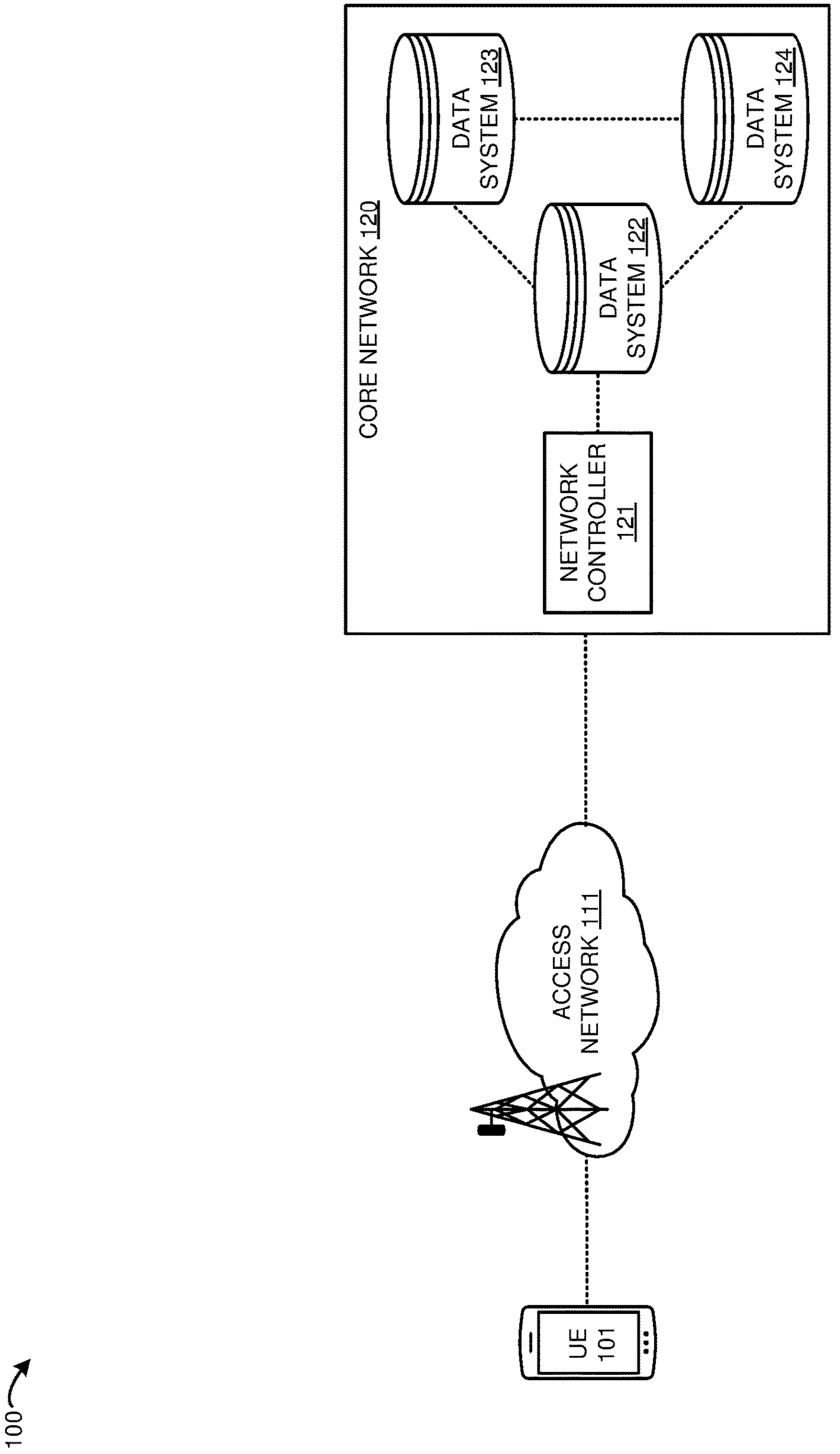
FIG. 1 illustrates a communication network to inhibit network data system signaling overload.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates communication network 100 network to inhibit network data system signaling overload. Communication network 100 delivers services like voice calling, machine communications, internet-access, media-streaming, or some other wireless/wireline communications product to user devices. Communication network 100 comprises User Equipment (UE) 101, access network 111, and core network 120. Core network 120 comprises network controller 121 and network data systems 122-124. In other examples, communication network 100 may comprise additional or different elements than those illustrated in FIG. 1.

Various examples of network operation and configuration are described herein. In some examples, UE 101 attaches to access network 111 and registers for wireless data services with network controller 121. Network controller 121 accesses data system 122 to retrieve service attributes for UE 101. The service attributes comprise metrics like Quality-of-Server (QoS), slice Identifiers (IDs), bitrates, service authorizations, and/or other data that defines the level of service to be provided for UE 101. Data system 122 provides the requested service attributes to network controller 121. Controller 121 serves UE 101 over access network 111 based on the service attributes. Network controller 121 may write data updates (e.g., mobility updates) for UE 101 to data system 122.

Data systems 122-124 interface with one another to maintain synchronization. Data system 122 implements the update received from network controller 121 and drives systems 123 and 124 to implement the update. Data systems 122-124 monitor their own health and the connection status with other ones of data systems 122-124. When the connection between ones of data systems 122-124 goes down (e.g., system 122 determines system 124 is non-responsive), data systems 122-124 mark the non-responsive ones of data systems 122-124 as faulty. When data systems 122-124 detect a hardware or software fault in their circuitry, the faulty ones of data systems 122-124 broadcast fault notifications to the other ones of data systems 122-124. The non-faulty ones of data systems 122-124 block update/synchronization signaling to faulty ones of systems 122-124 until the fault is resolved. By blocking signaling to defective data systems, network 100 inhibits excessive data system signaling and inhibits the formation of error loops. For example, when data system 123 is faulty, data system 122 will not generate excessive retry requests to push a data update to data system 123.

UE 101 is representative of a wireless user device. Exemplary user devices include phones, smartphones, computers, vehicles, drones, robots, sensors, and/or other devices with wireless communication capabilities. Access network 111 exchanges wireless signals with user devices 101 over radio frequency bands. The radio frequency bands use wireless network protocols like Fifth Generation New Radio (5GNR), Long Term Evolution (LTE), Institute of Electrical and Electronic Engineers (IEEE) 802.11 (WIFI), and Low- Power Wide Area Network (LP-WAN). Access network 111 is connected to core network 120 over backhaul data links. Access network 111 exchanges network signaling and user data with network elements in core network 120.

Access network 111 may comprise wireless access nodes, internet backbone providers, edge computing systems, or other types of wireless/wireline access systems to provide wireless links to user devices 101, the backhaul links to core network 120, and the edge computing services between user devices 101 and core network 120. Although access network 111 is illustrated as a tower, access network 111 may comprise another type of mounting structure (e.g., buildings), or no mounting structure at all. The wireless access nodes of access network 111 may comprise Fifth Generation (5G) Radio Access Networks (RANs) RANs, LTE RANs, gNodeBs, eNodeBs, NB-IoT access nodes, LP-WAN base stations, wireless relays, WIFI hotspots, Bluetooth access nodes, and/or other types of wireless or wireline network transceivers. The access nodes may comprise Radio Units (RUs), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 120. The CUs handle higher wireless network layers like the Radio Resource Control (RRC), Service Data Adaption Protocol (SDAP), and Packet Data Convergence Protocol (PDCP). The CUs are coupled to network functions in core network 120.

Core network 120 is representative of computing systems that provide wireless data services to user devices 101 over access network 111. Exemplary computing systems comprise data centers, server farms, Network Function Virtualization Infrastructure (NFVI), cloud computing networks, hybrid cloud networks, and the like. The computing systems of core network 120 store and execute the network functions to form network controller 121 and data systems 122-124 to provide wireless data services to user devices 101 over access network 111. Network controller 121 may comprise network functions like Access and Mobility Management Function (AMF), Session Management Function (SMF), User Plane Function (UPF), Policy Control Function (PCF), Service Communication Proxy (SCP), Unified Data Management (UDM), and Home Subscriber Server (HSS). Network data systems 122-124 may comprise network entities like Unified Data Registry (UDR) and the like. The computing systems of core network 120 typically store and execute network functions to form a control plane and a user plane to serve UE 101. The control plane typically comprises network functions like AMF, SMF, PCF, UDM, and HSS. The user plane typically comprises network functions like UPF. Core network 120 may comprise a Fifth Generation Core (5GC) architecture, an Evolved Packet Core (EPC) architecture, and the like.

Figure 2:
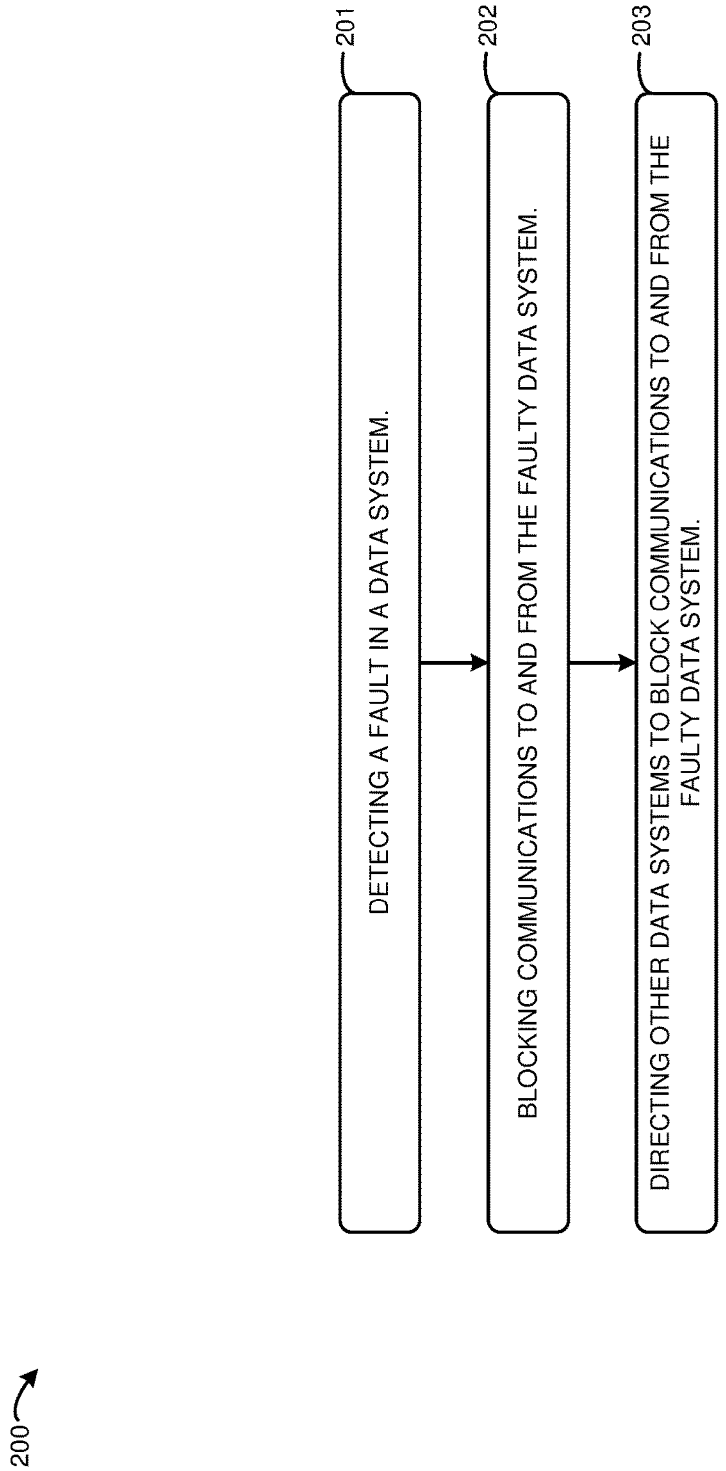
FIG. 2 illustrates an exemplary operation of the communication network to inhibit network data system signaling overload.

FIG. 2 illustrates process 200. Process 200 comprises an exemplary operation of communication network 100 to inhibit network data system signaling overload. The operation may vary in other examples. The operations of process 200 comprise detecting a fault in a data system (step 201). The operations further comprise blocking communications to and from the faulty data system (step 202). The operations further comprise directing other data systems to block communications to and from the faulty data system (step 203).

Figure 3:
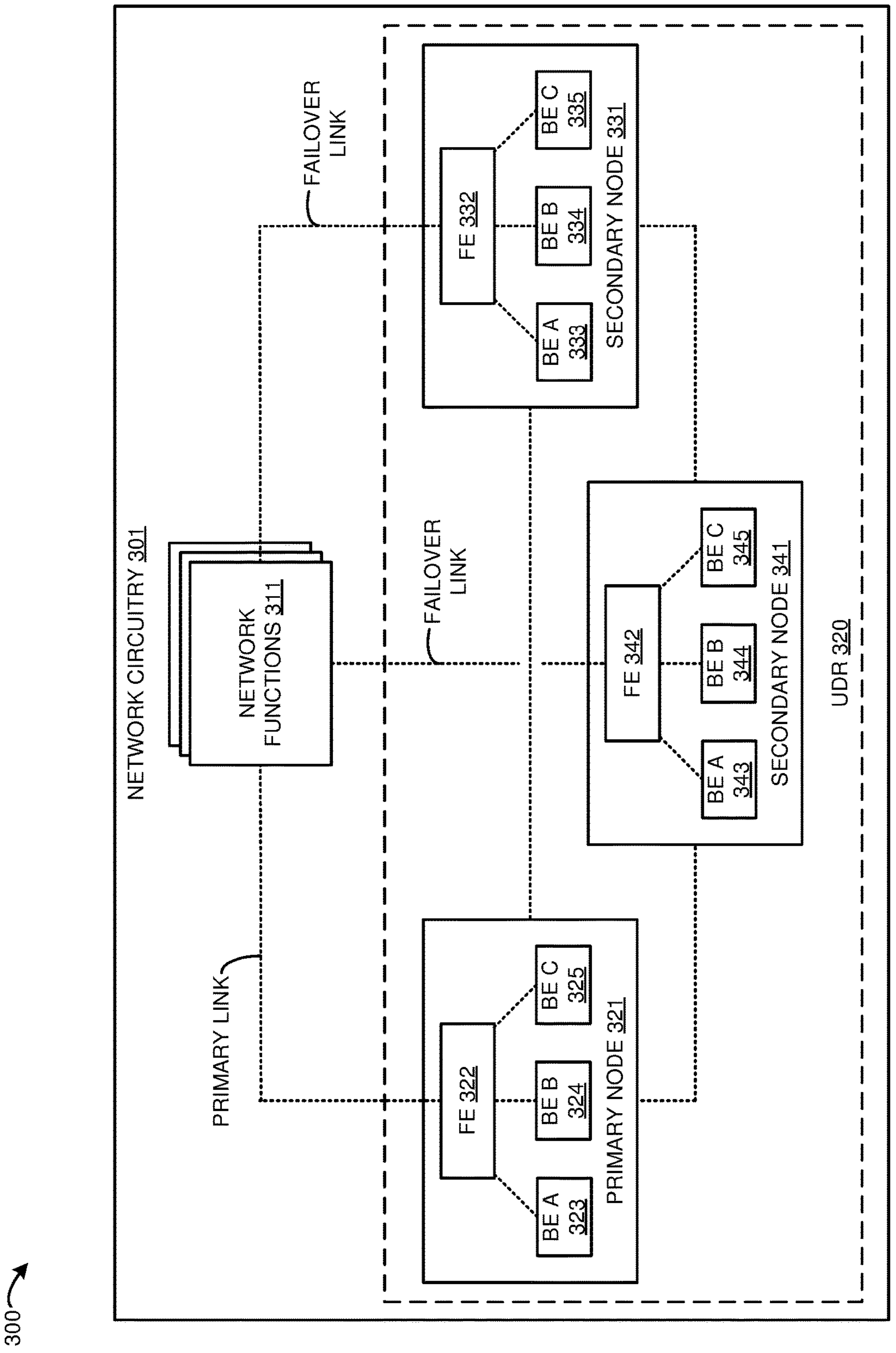
FIG. 3 illustrates a wireless communication network to inhibit network data system signaling overload.

FIG. 3 illustrates wireless communication network 300 to inhibit network data system signaling overload. Wireless communication network 300 is an example of communication network 100, however network 100 may differ. Wireless communication network 300 comprises network circuitry 301. Network circuitry 301 comprises network functions 311 and UDR 320. UDR 320 comprises primary UDR node 321, and secondary UDR nodes 331 and 341. Primary UDR node 321 comprises frontend (FE) node 322, backend (BE) node A 323, backend node B 324, and backend node C 325. Secondary UDR node 331 comprises frontend node 332, backend node A 333, backend node B 334, and backend node C 335. Secondary UDR node 341 comprises frontend node 342, backend node A 343, backend node B 344, and backend node C 345. In other examples, wireless network 300 may comprise additional or different elements than those illustrated in FIG. 3.

In some examples, network functions 311 write and read subscriber/network data stored by UDR nodes 321, 331, and 341. Node 321 is the primary node for network functions 311 and nodes 331 and 341 are the secondary (e.g., backup) nodes for functions 311. Frontend node 322 in primary node 321 receives the data read/write requests. Frontend 322 identifies which of backend nodes 323-325 stores data for the read/write request. For example, the request may indicate a user ID and frontend 322 may maintain an index that correlates storage locations to user identifiers. Once located, frontend 322 reads/writes the data to the identified storage location. In the case of data writing, the receiving backend node pushes the update to corresponding backend nodes in secondary UDR nodes 331 and 341. As illustrated in FIG. 3, the backend nodes are labeled A, B, and C. The nodes labeled A correspond to one another, the nodes labeled B correspond to one another, and the nodes labeled C correspond to one another. For example, backend nodes A 333 and 343 may maintain replicas of the data stored by backend node A 323 in primary node 321.

Backend nodes 323-325 monitor their connection status with corresponding backend nodes in secondary nodes 331 and 341 to detect UDR faults. When the backend nodes in primary node 321 determine their connection is down to corresponding backend nodes in secondary nodes 331 and 341, the backend node blacklists the non-responsive backend node and propagates this information to responsive backend nodes as well as its local frontend node. The responsive backend node and local frontend node receive this information and then blacklist the non-responsive node. For example, backend node A 323 may determine the connection to backend node A 343 is down. In response, node 323 blacklists node 343 and notifies backend node A 333. Backend node A 333 receives the notification and also blacklists node 343.

In addition to connection monitoring, the backend nodes in UDR nodes 321, 331, and 341 also monitor their own health. The backend nodes monitor CPU utilization, memory utilization, and hardware faults. When hardware faults occur or when CPU/memory utilization exceed utilization thresholds (e.g., over 90% memory utilization for over one minute), the affected backend nodes detect a fault condition and declare themselves unavailable to their corresponding backend nodes in the other UDR nodes as well as to their local frontend node.

When a backend node is blacklisted, the corresponding frontend and backend nodes in the other UDR nodes do not push updates/queries to the blacklisted node. The frontend nodes update the network topology (e.g., forwarding graph) to remove the blacklisted backend node to inhibit signaling from being routed to that node. When the fault condition subsides (e.g., by connection re-establishment or through declaration), the blacklist is removed from the affected node. For example, backend node A 323 in primary node 321 may determine its connection to backend node A 343 is back online. In response, node 323 notifies frontend node 322 and backend node 333 to whitelist node 343.

Advantageously, UDR 320 efficiently determines when one or more UDR nodes become desynchronized. Moreover, UDR 321, 331, and 341 effectively inhibit excessive signaling that results from UDR node desynchronization.

Network functions 311 and UDR 320 in network circuitry 301, communicate over various links that use metallic links, glass fibers, radio channels, or some other communication media. The links use Fifth Generation Core (5GC), Evolved Packet Core (EPC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols. Network circuitry 301 comprises microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, network functions, and multimedia functions. The microprocessors retrieve the software from the memories and execute the software to drive the operation of wireless communication network 300 as described herein.

Figure 4:
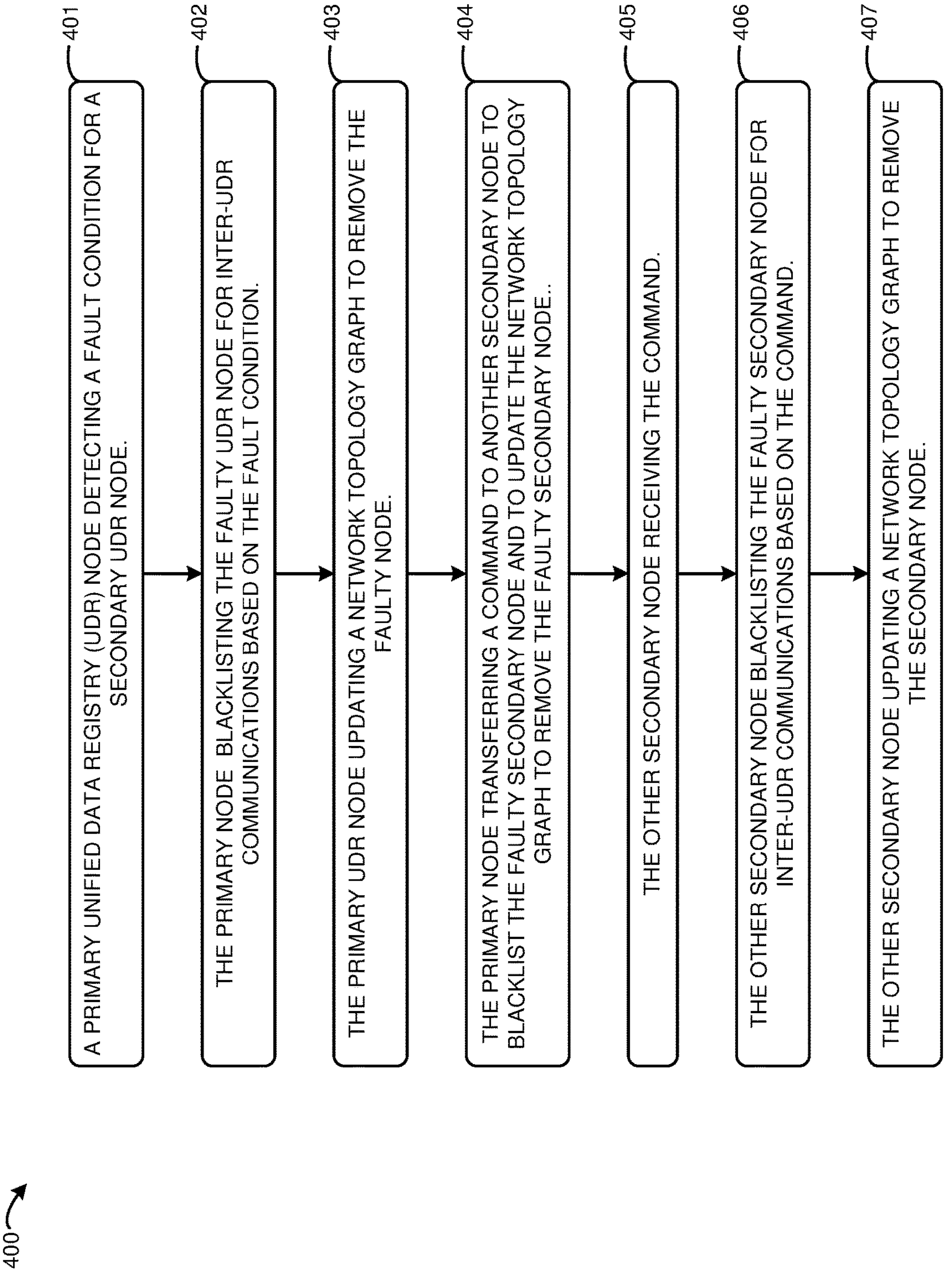
FIG. 4 illustrates an exemplary operation of the wireless communication network to inhibit network data system signaling overload.

FIG. 4 illustrates process 400. Process 400 comprises exemplary operations of wireless communication network 300 to inhibit network data system signaling overload. Process 400 comprises an example of process 200 illustrated in FIG. 2, however process 200 may differ. The operations of process 200 comprise a primary UDR node detecting a fault condition for a secondary UDR node (step 401). The operations further comprise the primary UDR node blacklisting the faulty secondary UDR node for inter-UDR communications based on the fault condition (step 402). The operations further comprise the primary UDR node updating a network topology graph to remove the faulty secondary UDR node (step 403). The operations further comprise the primary UDR node transferring a command to another secondary UDR to blacklist the faulty secondary UDR node and to update the network topology graph to remove the faulty secondary UDR node (step 404). The operations further comprise the other secondary receiving the command (step 405). The operations further comprise the other secondary UDR node blacklisting the faulty secondary UDR node for inter-UDR communications based on the command (step 406). The operations further comprise the other secondary UDR node updating a network topology graph to remove the faulty secondary UDR node (step 407).

Figure 5:
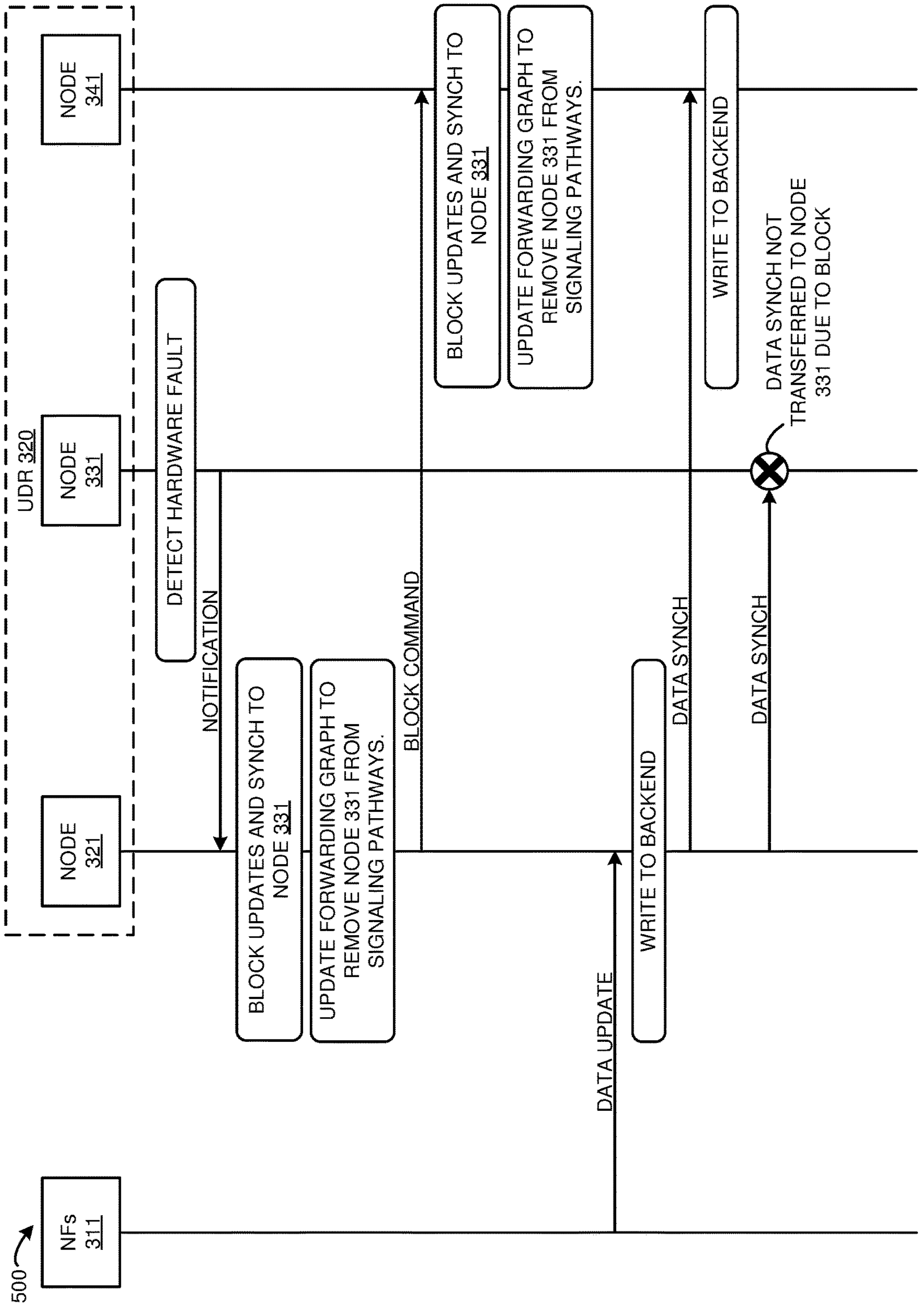
FIG. 5 illustrates an exemplary operation of the wireless communication network to inhibit network data system signaling overload.

FIG. 5 illustrates process 500. Process 500 comprises exemplary operations of wireless communication network 300 to inhibit network data system signaling overload. In some examples, UDR node 331 detects a hardware fault and reports the detected hardware faults to primary UDR node 321. Primary node 321 receives the notification and blocks update and synchronization signaling to node 331. For example, backend node A 323 in node 321 may receive a notification from backend node A 333 in node 331 indicating that a fault condition exists in that node. In response backend node 323 may blacklist node 333 for synchronization updates and notify frontend node 322. Primary node 321 updates its forwarding graph to remove node 331 from its signaling pathways. For example, frontend node 322 may receive the notification from backend node 323 indicating that node 333 is blacklisted and frontend node 323 may responsively update its forwarding graph to avoid signaling that blacklisted node. Node 321 transfers a block command to node 341. In response, node 341 blocks updates and synchronization signaling to node 331 and updates its forwarding graph to remove node 331 from its signaling pathways.

Subsequently, node 321 receives a data update from network functions 311. Node 321 identifies the storage location for the update and writes the update to the backend node. For example, frontend 322 may compare a user ID (e.g., Subscriber Permanent Identifier (SUPI) or Subscriber Concealed Identifier (SUCI)) included in the update to a profile index to determine which of backend nodes 322-324 to write the update to. Once the update is implemented, node 321 transfers a data synchronization command to node 341. Node 341 receives the command and writes the update to the appropriate backend node to maintain synchronization between the data records stored in nodes 321 and 341. Node 321 does not transfer the synchronization command to node 331 since node 331 is blocked for inter-UDR signaling. For example, frontend node 322 may receive the data update and avoid signaling node 331 based on the updated forwarding graph.

Figure 6:
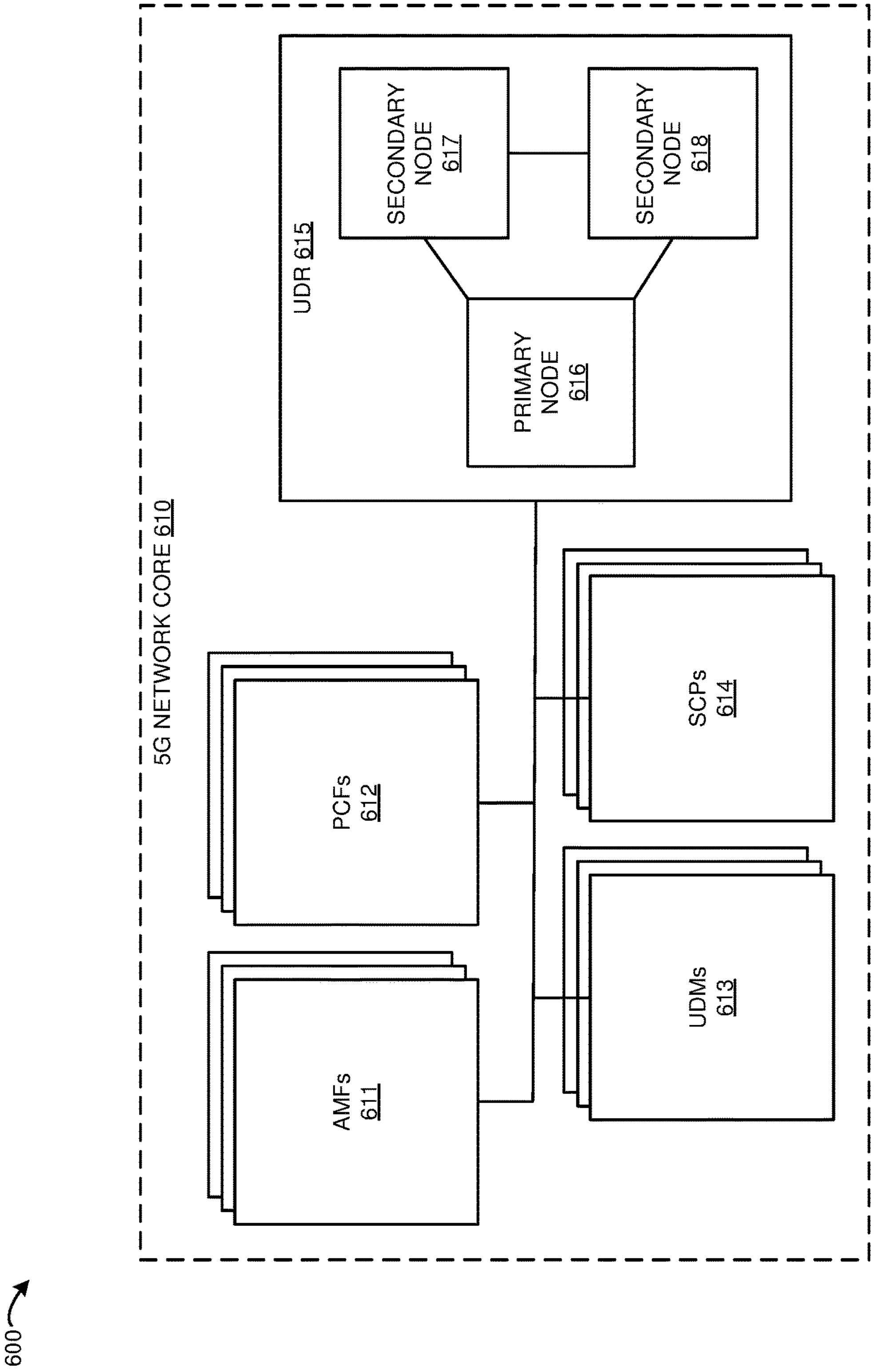
FIG. 6 illustrates a Fifth Generation (5G) wireless communication network to inhibit network data system signaling overload.

FIG. 6 illustrates 5G communication network 600 to inhibit network data system signaling overload. 5G communication network 600 comprises an example of communication network 100 illustrated in FIG. 1 and wireless communication network 300 illustrated in FIG. 3, however networks 100 and 300 may differ. 5G communication network 600 comprises 5G network core 610. 5G network core 610 comprises Access and Mobility Management Functions (AMFs) 611, Policy Control Functions (PCFs) 612, Unified Data Managements (UDMs) 613, Service Communication Proxies (SCPs) 614 and Unified Data Registry (UDR) 615. UDR 615 has a multi-node architecture and comprises UDR nodes 616-618. Other network functions and network entities like Session Management Function (SMF), User Plane Function (UPF), Authentication Server Function (AUSF), Network Slice Selection Function (NSSF), Network Repository Function (NRF), Equipment Identity Register (EIR), Network Exposure Function (NEF), and Application Function (AF) are typically present in 5G network core 610 but are omitted for clarity. Network 600 typically comprises other elements like Radio Access Networks (RANs), User Equipment (UE), and data networks however these elements are omitted for clarity. In other examples, 5G communication network 600 may comprise different or additional elements than those illustrated in FIG. 6.

In some examples, AMFs 611, PCFs 612, and UDMs 613 transfer data updates and data queries to SCPs 614 for delivery to UDR 615. SCPs 614 receive the updates and queries and route the received signaling to UDR 615. UDR node 616 is primary node from AMFs 611, PCFs 612, and UDMs 613. The primary designation may be due to geographic proximity, node capabilities, based on point of contact, or may be arbitrary. Primary node 616 receives the updates and queries from network functions 611-613 over SCPs 614. For data queries, node 616 locates the storage location of the requested data and returns the read information to the requesting ones of network functions 611-613 via SCPs 614. For example, node 616 may receive a UE context read request from one of UDMs 613 and primary node 616 may locate a subscriber profile for the corresponding UE and return subscriber data stored in the profile to the requesting UDM.

For data updates, primary node 616 locates the storage location to write the update to and updates the located data. Primary node 616 pushes the updates to secondary nodes 617 and 618 to maintain synchronization between nodes 616-618. Secondary nodes 617 and 618 both store replicas of the data maintained by primary node 616. Secondary nodes 617 and 618 receive the update from primary node 616 and update their replica data accordingly. For example, one of PCFs 612 may transfer a mobility update for a UE to primary node 616 via SCPs 614. Primary node 616 may write the mobility update to the UE's subscriber profile and then push the update to secondary nodes 617 and 618 which write the mobility update to their replicas of the UE's subscriber profile.

In some examples, primary node 616 may not be able to receive updates/queries from network functions 611-613. For example, the traffic volume towards node 616 may be too high and requests forwarded to node 616 by SCPs 614 may time out. When primary node 616 is unable to be reached, SCPs 614 notify network functions 611-613 which then failover to one of secondary UDR nodes 617 and 618. Network functions 611-613 resend the update/queries to secondary UDR nodes 617 and 618 over SCPs 614. For data queries, secondary nodes 617 and 618 locate and return the requested information to network functions 611-613. For data updates, secondary nodes 617 and 618 first push the update to primary node 616 over their inter-UDR links. Primary node 616 receives the forwarded update and then writes the update to the intended storage location. Primary node 616 then pushes the update to secondary nodes 617 and 618 (including the node which initially received the update) which then receive and implement the update. In other examples, UDR 615 may comprise a multi-primary node architecture where the receiving node is instead designated the primary UDR node. For example, in a multi-primary architecture, if secondary UDR node 617 receives a data update via SCPs 614, node 617 is designated the primary UDR node for that update.

UDR nodes 616-618 monitor their inter-UDR communication links to detect fault conditions within UDR 615. When primary node 616 detects that its connection is down to a secondary UDR node, primary node 616 detects a fault condition for the non-responsive secondary UDR node. Primary node 616 blocks the secondary node for inter-UDR signaling and updates its network topology graph to remove the blocked secondary node. Primary node 616 transfers block commands to the responsive secondary UDR nodes that indicate the non-responsive secondary node. Upon receiving the block command, the responsive secondary UDR nodes also block the non-responsive UDR node for inter-UDR communications and update their network topology graphs to remove the blocked UDR node. Primary node 616 also notifies network functions 611-613 over SCPs 614 to block the non-responsive UDR node. Network functions 611-613 avoid failing over to the blocked UDR node based on the notification.

Primary node 616 continues to monitor the connection status to the non-responsive UDR node. For example, secondary node 617 may be non-responsive and primary node 616 may periodically ping node 617 to determine the connection status. When primary node 616 determines the connection is back online (e.g., by receiving a ping response), primary node 616 unblocks the previously non-responsive secondary node and adds the node to into the network topology graph. Primary node 616 transfers unblock commands to the responsive secondary UDR nodes that indicate the now responsive secondary node. Upon receiving the unblock command, the responsive secondary UDR nodes also unblock the previously non-responsive UDR node for inter-UDR communications and update their network topology graphs to add the node. Primary node 616 also notifies network functions 611-613 over SCPs 614 to unblock the UDR node. Network functions 611-613 may failover to the unblocked UDR node based on the notification.

In addition to connection monitoring, UDR nodes 616-618 monitor CPU utilization, memory utilization, and monitor for hardware faults (e.g., DIMM failure) to detect fault conditions in themselves. Nodes 616-618 compare the measured CPU utilization metrics, memory utilization metrics, and hardware fault detection metrics to a set of fault condition thresholds. For CPU and memory utilizations, the fault condition thresholds specify a utilization percentage and a time period where if the measured utilization exceeds the threshold utilization for the specified time period, the threshold is triggered. For hardware faults, the fault condition threshold is triggered if a hardware fault is detected. For example, the fault condition thresholds may comprise:

$$CPU\ TH\text{: } CPU\ util \geq 95\% \text{ and } t \geq 5 \text{ min}$$

$$\text{Memory } TH\text{: memory } util \geq 90\% \text{ and } t \geq 1 \text{ min}$$

$$HW \text{ Fault } TH\text{: detected fault} = YES$$

where CPU util is the measured CPU utilization, memory util is the measured memory utilization, and t is the measurement time period. For the above thresholds, a UDR node detects a fault condition if the measured CPU utilization exceeds 95% for at least five minutes, the measured memory utilization exceeds 90% for at least one minute, or if a hardware fault is detected.

When a fault condition threshold is triggered in one of UDR nodes 616-618, the affected node detects a fault condition and notifies the other UDR nodes. In response, the other UDR nodes block the affected node for inter-UDR communications and remove the affected node from their network topology graphs. The affected node also notifies network functions 611-613. Network functions 611-613 avoid failing over to the affected UDR node based on the notification. The affected UDR continues to monitor CPU utilization, memory utilization, and monitors for hardware faults to determine when the conditions that triggered the fault condition subside. For example, the affected UDR may compare the measured performance metrics (e.g., CPU utilization) to the fault condition thresholds to determine when the threshold conditions are no longer satisfied. Alternatively, the affected UDR may set a cooldown timer and resume normal operations when the time expires. When the fault condition threshold is no longer satisfied (e.g., the hardware fault is resolved), the previously affected UDR notifies the other UDR nodes. In response, the other UDR nodes unblock the previously affected node for inter-UDR communications and add the affected node to their network topology graphs. The previously affected node also notifies network functions 611-613. Network functions 611-613 may failover to the previously affected UDR node based on the notification.

In some examples, network functions 611-613 assess the health of UDR nodes 616-618 independently from UDR 615. Network functions 611-613 track UDR KPIs for query success rate and update success rate. For example, UDMs 613 may determine 90% of the data queries to UDR node 616 were successful and 88% of the data updates to UDR node 616 were successful. Network functions 611-613 compare the query success KPIs, update success KPIs, and the ratio of query success KPIs to update success KPIs to fault condition thresholds. For update success KPIs and query success KPIs, the fault condition thresholds specify a success rate where if the measured KPIs fall below the threshold success rate the threshold is triggered. For the KPI ratio, the fault condition threshold is triggered if the difference between update success KPIs and query success KPIs exceeds a threshold value. For example, the fault condition thresholds applied by network functions 611-613 may comprise:

$$\text{Query } KPI\ TH\text{: Query } sr \leq 95\%$$

$$\text{Update } KPI\ TH\text{: } Upate\ sr \leq 95\%$$

$$KPI \text{ Ratio } TH\text{: } |\text{Query } sr - Upate\ sr| \geq 3\%$$

where Query sr is the measured query success rate and Update sr is the measured update success rate. For the above thresholds, a network function detects a fault condition in a UDR node if query success rate falls below 95%, the update success rate falls below 95%, or the difference between the query success rate and the update success rate exceeds 3%.

Figure 7:
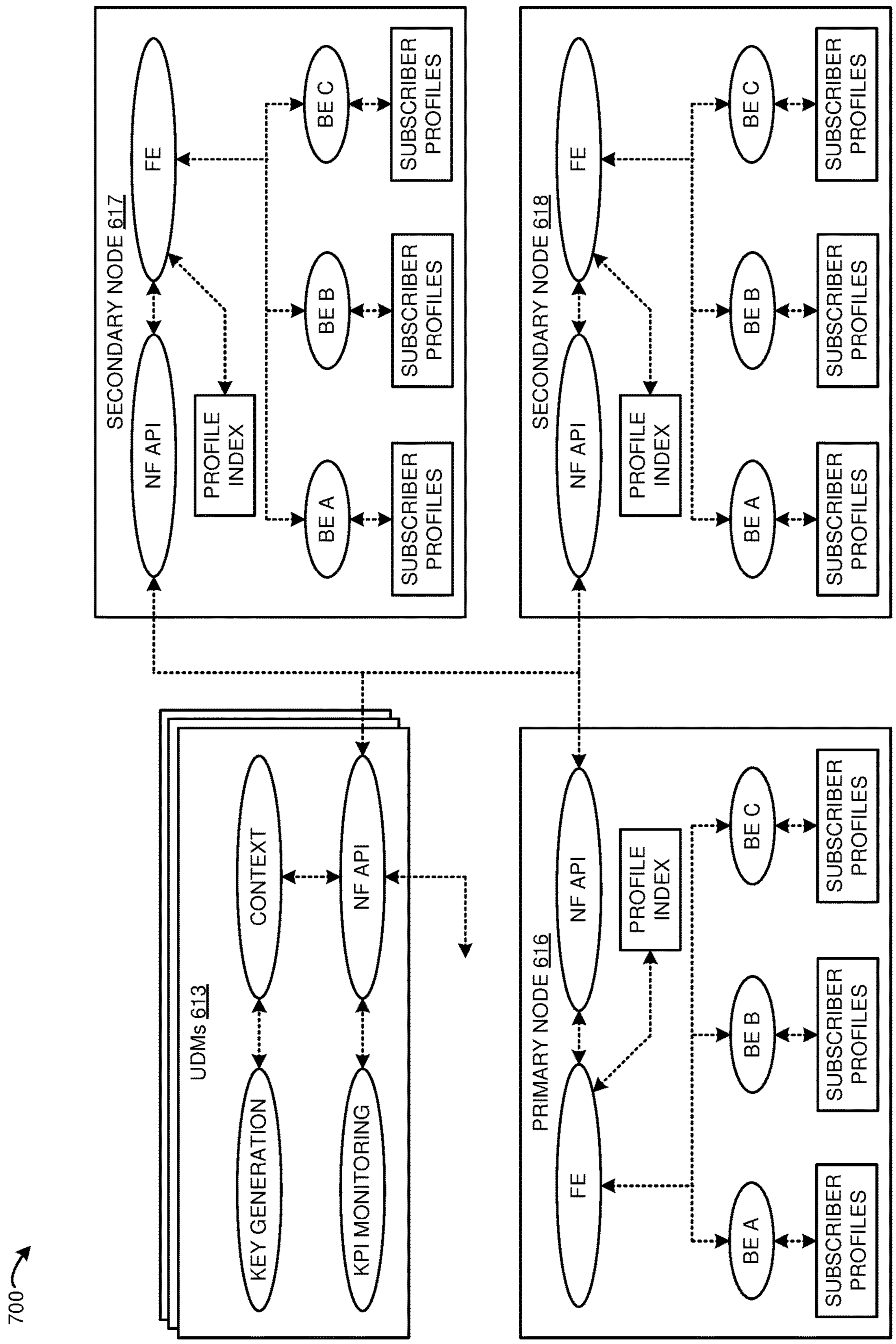
FIG. 7 illustrates network functions in the 5G wireless communication network.

FIG. 7 illustrates UDMs 613 and UDR nodes 616-618 in 5G wireless communication network 600. In some examples, UDMs 613 comprise modules for UE context generation, key generation, UDR KPI monitoring, and network function (NF) Application Programming Interface (API). The context generation module retrieves subscribed service attributes for UEs from UDR 615 to generate context for AMFs 611 to serve the UEs. The key generation module generates authentication data for AMFs 611 to use to authenticate UEs. The KPI management monitoring module tracks the success rate of data queries, data updates, and the ratio between successful queries and successful updates to determine when one or more of UDR nodes 616-618 are faulty. When a fault is detected by UDMs 613, UDMs 613 failover to a another one of UDR nodes 616-618 and update their network forwarding graphs to remove the faulty UDR node. AMFs 611 and PCFs 612 comprise similar KPI monitoring modules. SCPs 614 may also comprise similar KPI monitoring modules.

UDR nodes 616-618 comprise modules for network function API, frontend nodes, backend nodes, and store a profile index and subscriber profiles. The frontend nodes field data queries and data updates from UDMs 613 (and the other network functions in core 610). The requests are typically associated with a subscriber in network 600 and indicate the subscriber by an identifier (e.g., SUCI/SUPI). The frontend nodes interface with the profile index to locate which backend node stores the subscriber data associated with the request. For example, the profile index may correlate SUPI ranges to ones of backend nodes A-C. The frontend nodes access backend nodes A-C based on the output from the profile index. Backend nodes A-C store subscriber profiles for the subscribers of network 600. Backend nodes A-C serve the requested subscriber data to the frontend node. The subscriber profile comprises service data like access and mobility data (AmData), session management subscription data (SmSubsData), SMS management subscription data (SmsMngSubsData), DNN configurations (DnnConfigurations), Trace Data (TraceData), S-NSSAI information (SnssaiInfos), and virtual network group data (VnGroupDatas). Corresponding ones of backend nodes A-C in different ones of UDR nodes 616-618 store replicas of the subscriber profiles. For example, the subscriber profiles stored by backend nodes A in UDR nodes 617 and 618 may comprise replicas of the subscriber profiles stored by backend node A in UDR node 616.

The backend nodes monitor the communication links between UDR nodes 616-618. When a communication link to a UDR is determined to be down, the backend nodes of the other UDR nodes mark that UDR node as faulty and block data updates and data synchronization to the faulty UDR node. The backend nodes notify their local frontend nodes to avoid using the blocked backend node. In addition to connection monitoring, the backend nodes of the UDR nodes monitor their own health. The backend nodes monitor metrics like CPU utilization and memory utilization and detect hardware faults to assess the health of UDR nodes 616-618. When hardware faults are detected and/or when CPU/memory utilization exceeds a threshold utilization (e.g., 90%) for a threshold period of time (e.g., 5 minutes), the backend nodes declare themselves as faulty and broadcast a fault notification to the other UDR nodes to block the faulty UDR node for update and synchronization signaling. The network function APIs allow UDMs 613 and UDR nodes 616-618 to exchange signaling with each other and with the other network functions in 5G core 610.

Figure 8:
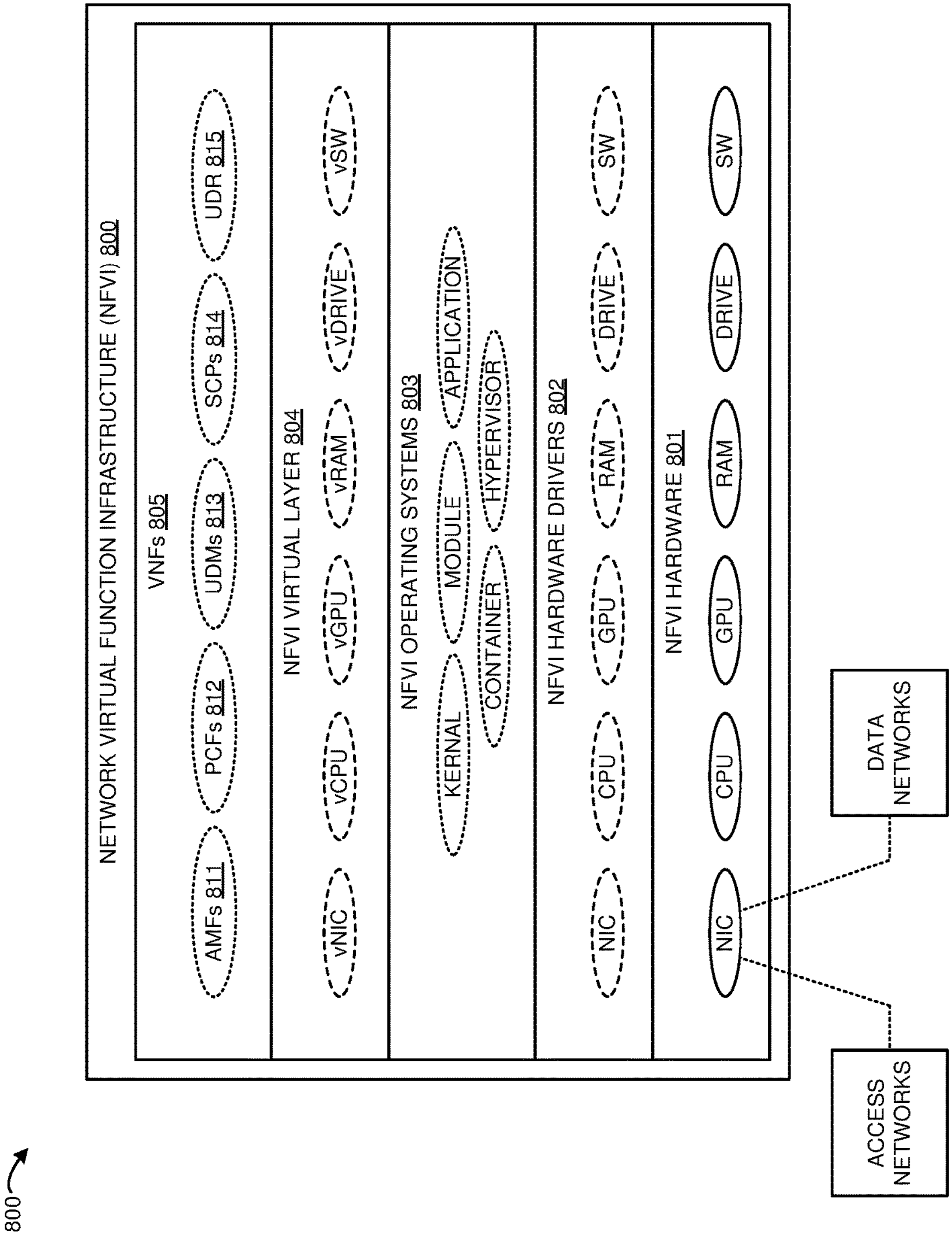
FIG. 8 illustrates a Network Function Virtualization Infrastructure (NFVI) in the 5G wireless communication network.

FIG. 8 illustrates Network Function Virtualization Infrastructure (NFVI) 800 in 5G wireless communication network 600. NFVI 800 comprises an example of core network 120 illustrated in FIG. 1 and network circuitry 301 illustrated in FIG. 3, although core network 120 and network circuitry 301 may differ. NFVI 800 comprises NFVI hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, GPU, RAM, Flash/Disk Drives (DRIVE), and Data Switches (SW). NFVI hardware drivers 802 comprise software that is resident in the NIC, CPU, GPU, RAM, DRIVE, and SW. NFVI operating systems 803 comprise kernels, modules, applications, containers, hypervisors, and the like. NFVI virtual layer 804 comprises vNIC, vCPU, vGPU, vRAM, vDRIVE, and vSW. NFVI VNFs 805 comprise AMFs 811, PCFs 812, UDMs 813, SCPs 814, and UDR 815. Additional VNFs and network elements like SMF, UPD, AUSF, NSSF, NRF, EIR, NEF, and AF are typically present but are omitted for clarity. NFVI 800 may be located at a single site or be distributed across multiple geographic locations. The NIC in NFVI hardware 801 is coupled to access networks and data networks. NFVI hardware 801 executes NFVI hardware drivers 802, NFVI operating systems 803, NFVI virtual layer 804, and NFVI VNFs 805 to form AMFs 611, PCFs 612, UDMs 613, SCPs 614, and UDR 615.

Figure 9:
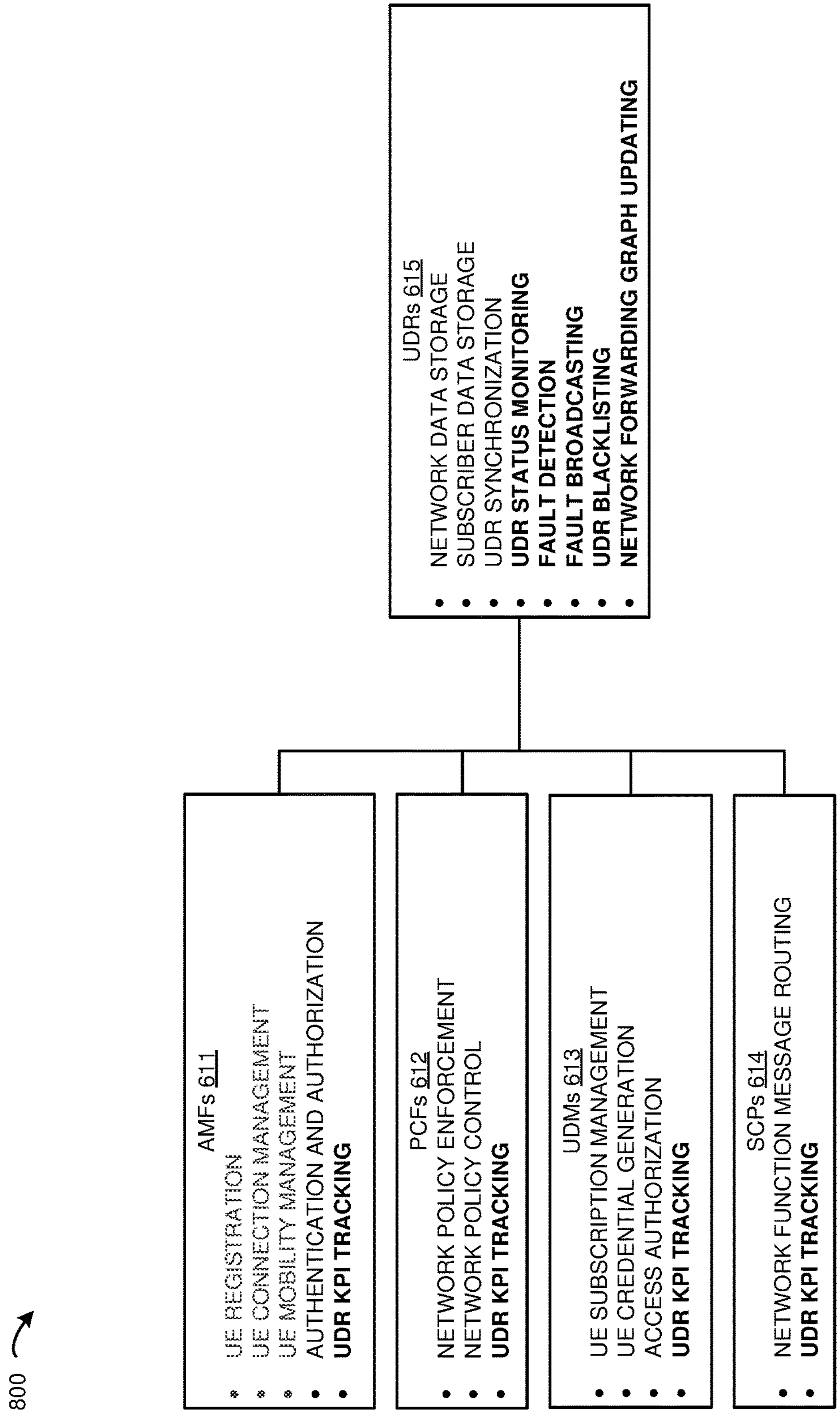
FIG. 9 further illustrates the NFVI in the 5G wireless communication network.

FIG. 9 further illustrates NFVI 800 in 5G communication network 600. AMFs 611 comprise capabilities for UE access registration, UE connection management, UE mobility management, UE authentication, UE authorization, and UDR KPI tracking. PCFs 612 comprise capabilities for network policy enforcement, network policy control, and UDR KPI tracking. UDMs 613 comprise capabilities for UE subscription management, UE credential generation, UE access authorization, and UDR KPI tracking. SCPs 614 comprise capabilities for network function message routing and UDR KPI tracking. UDR 615 comprises capabilities for network data storage, subscriber data storage, UDR synchronization, UDR status monitoring, fault detection, fault broadcasting, UDR blacklisting, and network forwarding graph updating.

In some examples, primary UDR node 616 detects a fault in secondary node 617. Node 616 may detect the fault based on reporting from node 617 (e.g., after a fault threshold is triggered) or may detect the fault based on a node 617 becoming non-responsive. In response to determining a fault condition exists in secondary node 617, primary UDR node 616 blocks node 617 for all inter-UDR communication (e.g., update forwarding, synchronization checks, etc.). Primary node 616 updates its forwarding graph to remove UDR 617 from its available signaling pathways and directs secondary node 618 to also block node 617. Similar to primary node 616, secondary node 618 blocks secondary node 616 for all inter-UDR communications. When blocked, stale or otherwise desynchronized data cannot be retrieved from node 617 and served to network functions 611-613. Primary node 616 exposes (e.g., by API call) UDR topology data to network functions 611-613 that indicates secondary node 617 is no longer available. Network functions 611-613 receive the notification either directly or via SCPs 614 and update their forwarding graphs to remove secondary node 617. Once removed, network functions 611-613 can no longer failover to secondary node 617.

Primary node 616 monitors the status of secondary node 617. When primary node 616 determines the fault condition is no longer present in node 617 (e.g., based on an active connection or by declaration by node 617), node 616 unblocks secondary node 617 for inter-UDR communications. Node 616 transfers a synchronization command to secondary node 617 to overwrite any stale or desynched data. Node 616 updates its forwarding graph to include secondary node 617 in its signaling pathways and directs secondary node 618 to unblock node 617. Similar to node 616, node 618 unblocks secondary node 617 for inter-UDR communications and updates its forwarding graph accordingly. Primary node 616 exposes updated UDR topology data to network functions 611-613 that indicates secondary node 617 is now available. Network functions 611-613 receive the notification either directly or via SCPs 614 and update their forwarding graphs to add secondary node 617. Once added, network functions 611-613 may once again failover to secondary node 617.

Figure 10:
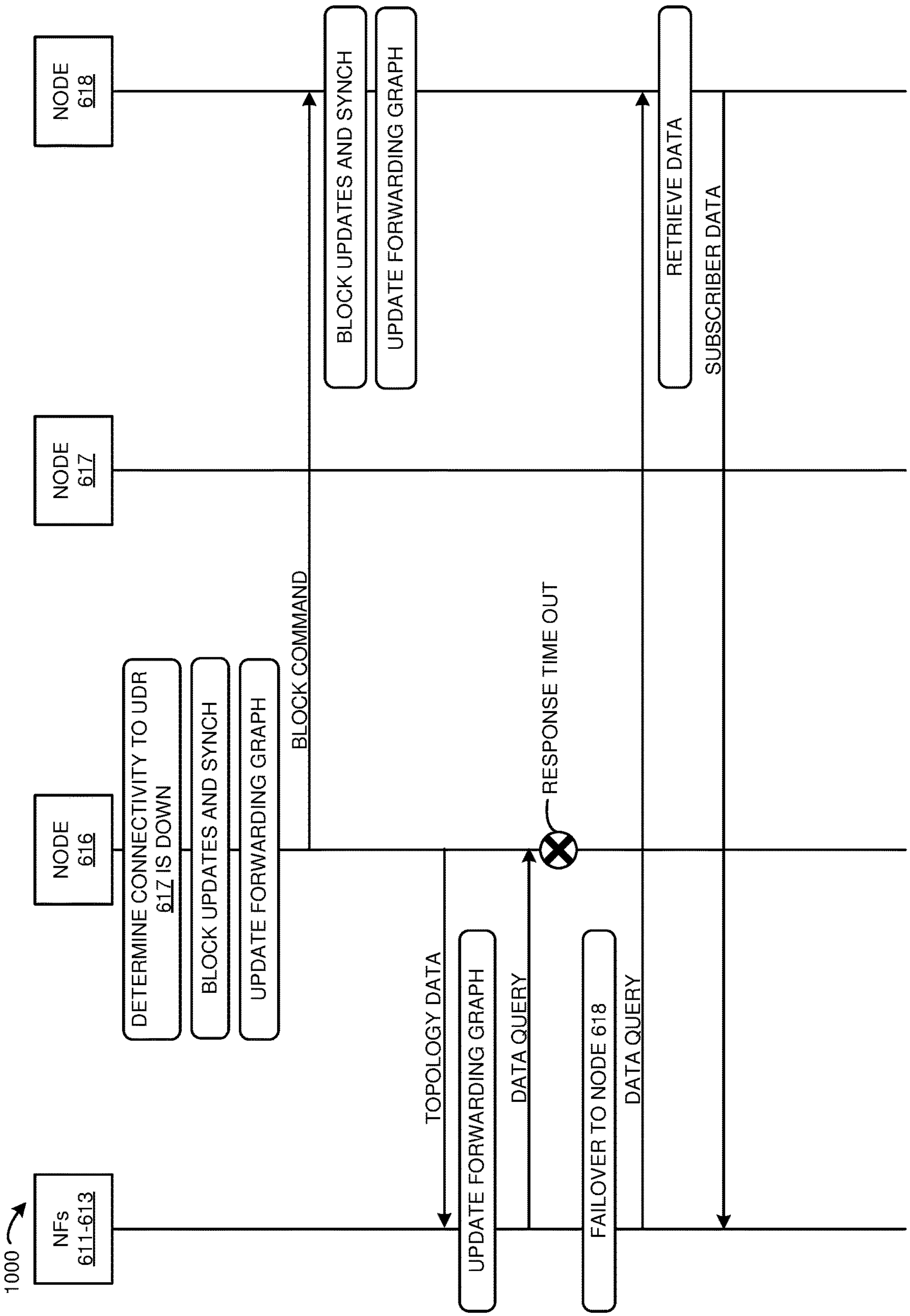
FIG. 10 illustrates an exemplary operation of the 5G wireless communication network to inhibit network data system signaling overload.

FIG. 10 illustrates process 1000. Process 1000 comprises exemplary operations of 5G wireless communication network 600 to inhibit network data system signaling overload. In some examples, primary UDR node 616 determines its inter-UDR link to node 617 is down. For example, the backend in primary node 616 may ping a corresponding backend in secondary node 617 and primary node 616 may declare secondary node 617 non-responsive when a response is not received. Primary node 616 blocks update and synchronization signaling to node 617 and updates its forwarding graph to remove node 617. Primary node 616 transfers a block command to secondary node 618. Node 618 blocks updates and synchronization signaling to node 618 and updates its forwarding graph to remove node 617. Primary node 616 exposes UDR topology data that indicates node 617 is unavailable to network functions 611-613. Network functions 611-613 update their forwarding graphs to remove node 617.

Subsequently, one of network functions 611-613 transfers a data query to primary node 616. For example, one of UDMs 613 may transfer a request for authentication vectors for a UE to node 616. Primary node 616 fails to respond to the request and request times out. The requesting network function accesses its forwarding graph and determines to failover to secondary node 618. The requesting function transfers the data query to node 618. Secondary node 618 retrieves the requested data and transfers the data to the requesting network function. By updating the forwarding graph and failing over to secondary node 618, the requesting network function avoids failing over to faulty secondary node 617. By not failing over to secondary node 617 while a fault condition exists, the requesting network function avoids being served stale or desynchronized subscriber data and avoids transferring excessive retry requests to the faulty node.

Figure 11:
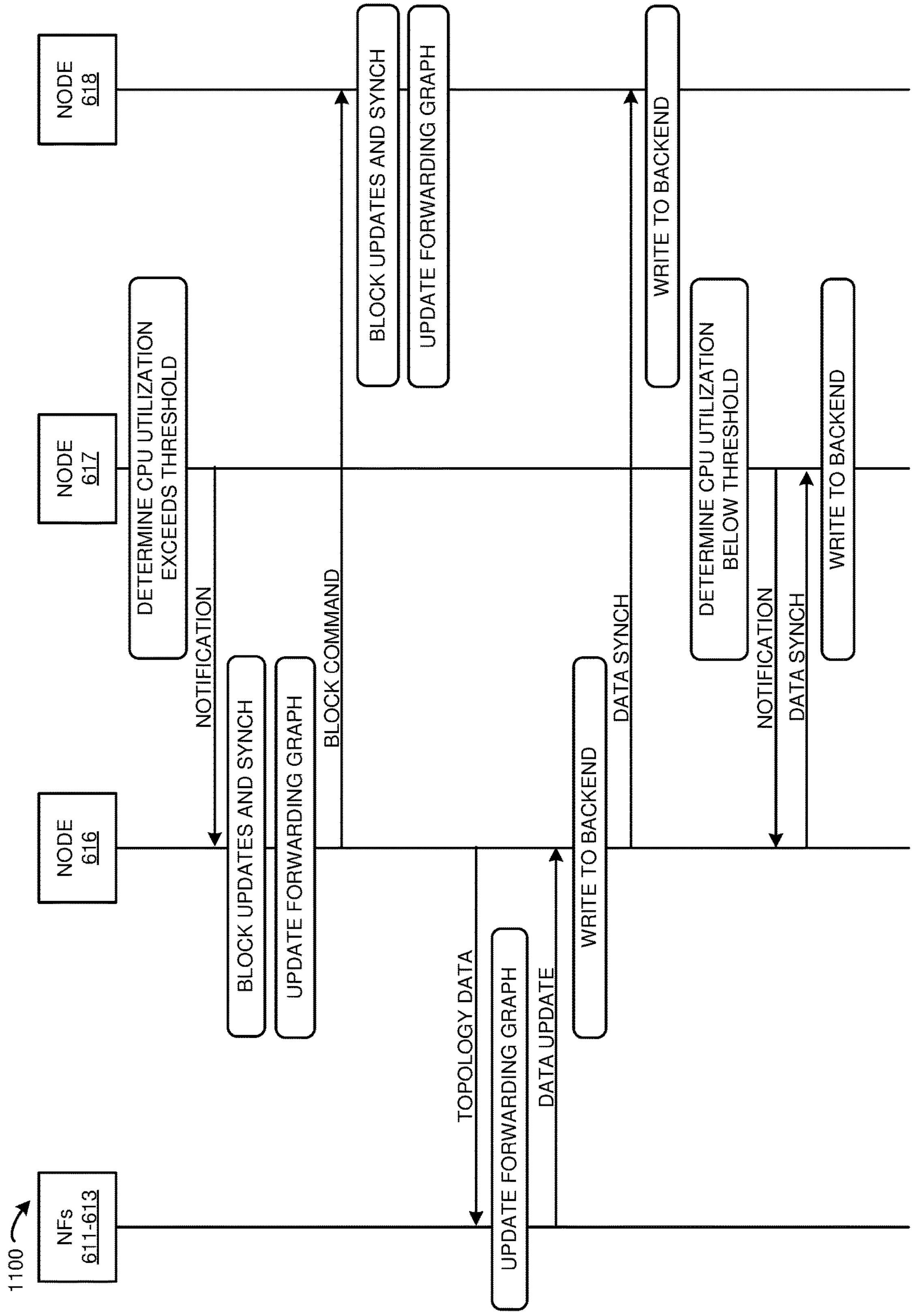
FIG. 11 illustrates an exemplary operation of the 5G wireless communication network to inhibit network data system signaling overload.

FIG. 11 illustrates process 1100. Process 1100 comprises exemplary operations of 5G wireless communication network 600 to inhibit network data system signaling overload. In some examples, a backend in secondary node 617 determines its CPU utilization exceeds a fault condition threshold. In response, node 617 transfers a notification to primary node 616 indicating that a fault condition is present in node 617. Primary node 616 receives the notification and blocks node 617 for update and synchronization signaling. Node 616 updates its forwarding graph to remove node 617. Primary node 616 transfers a block command to secondary node 618. Node 618 blocks updates and synchronization signaling to node 618 and updates its forwarding graph to remove node 617. Primary node 616 exposes UDR topology data that indicates node 617 is unavailable to network functions 611-613. Network functions 611-613 update their forwarding graphs to remove node 617.

One of network functions 611-613 transfers a data update to primary node 616. For example, one of PCFs 612 may transfer a mobility update for a UE to node 616. Primary node 616 locates the storage location for the subscriber profile associated with the update and writes the update to the subscriber profile. Since secondary node 617 is blocked for inter-UDR communication, primary node 616 only pushes the update to node 618. Secondary node 618 locates the storage location for the replica profile associated with the update and writes the update to the replica profile. Subsequently, node 617 determines its CPU utilization is below the fault threshold and responsively determines the fault condition is no longer present. Secondary node 617 notifies primary node 616 that the fault condition is resolved. Primary node 616 unblocks node 617 and pushes the data update to node 617. Secondary node 617 locates the storage location for the replica profile associated with the update and writes the update to the replica profile.

Figure 12:
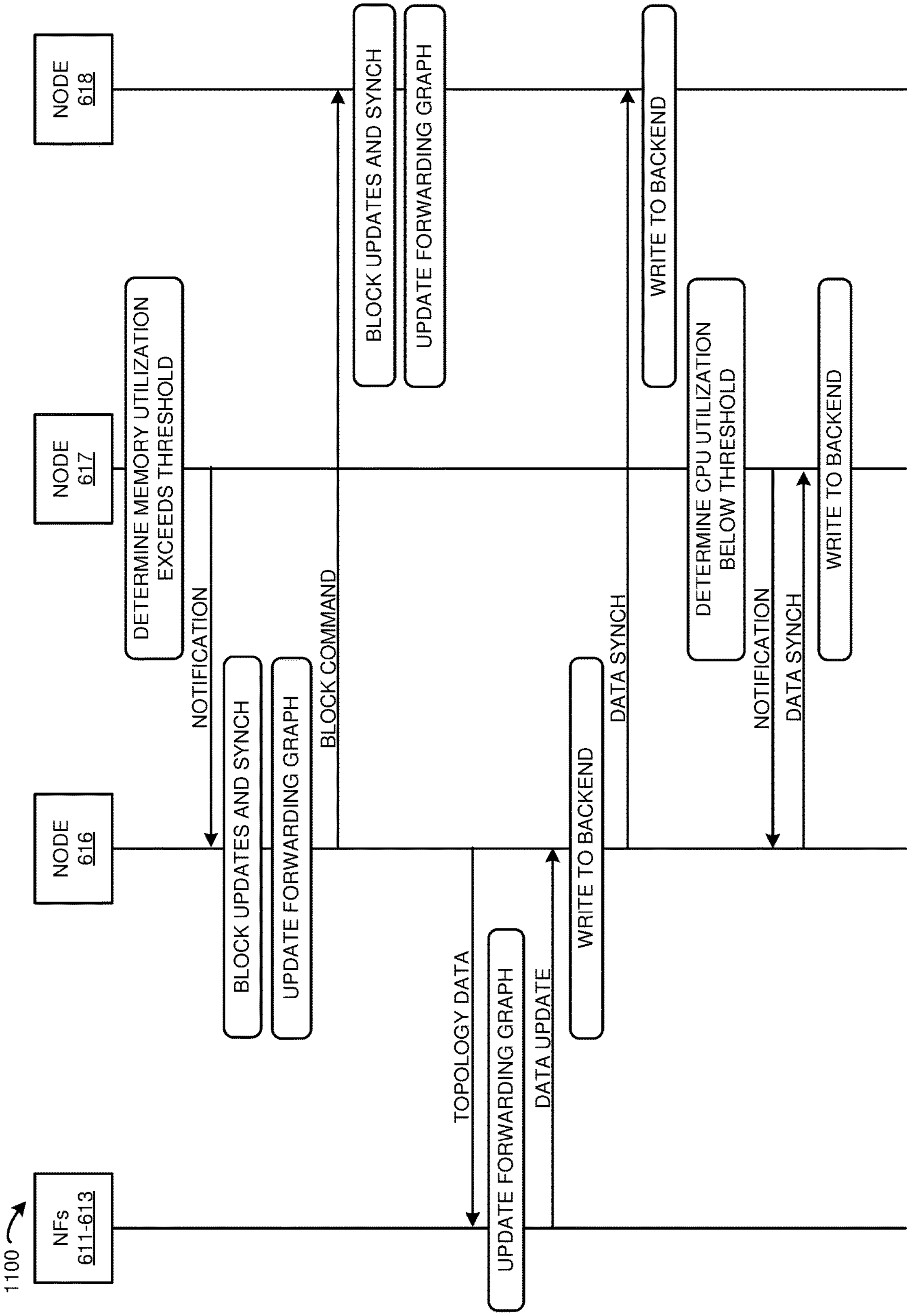
FIG. 12 illustrates an exemplary operation of the 5G wireless communication network to inhibit network data system signaling overload.

FIG. 12 illustrates process 1200. Process 1200 comprises exemplary operations of 5G wireless communication network 600 to inhibit network data system signaling overload. In some examples, a backend in secondary node 617 determines its memory utilization exceeds a fault condition threshold. In response, node 617 transfers a notification to primary node 616 indicating that a fault condition is present in node 617. Primary node 616 receives the notification and blocks node 617 for update and synchronization signaling. Node 616 updates its forwarding graph to remove node 617. Primary node 616 transfers a block command to secondary node 618. Node 618 blocks updates and synchronization signaling to node 618 and updates its forwarding graph to remove node 617. Primary node 616 exposes UDR topology data that indicates node 617 is unavailable to network functions 611-613. Network functions 611-613 update their forwarding graphs to remove node 617.

One of network functions 611-613 transfers a data update to primary node 616. Primary node 616 writes the update to the subscriber profile. Primary node 616 pushes the update to node 618. Secondary node 618 writes the update to the replica profile. Subsequently, node 617 determines its memory utilization is below the fault threshold and responsively determines the fault condition is no longer present. Secondary node 617 notifies primary node 616 that the fault condition is resolved. Primary node 616 unblocks node 617 and pushes the data update to node 617. Secondary node 617 writes the update to the replica profile. By avoiding sending updates to node 617 when a fault condition is present, primary node 617 avoids attempting to implement a data update when the update cannot be processed by the receiving node thereby reducing the likelihood that the nodes of UDR 615 become desynchronized and reducing the overall signaling burden of UDR 615.

Figure 13:
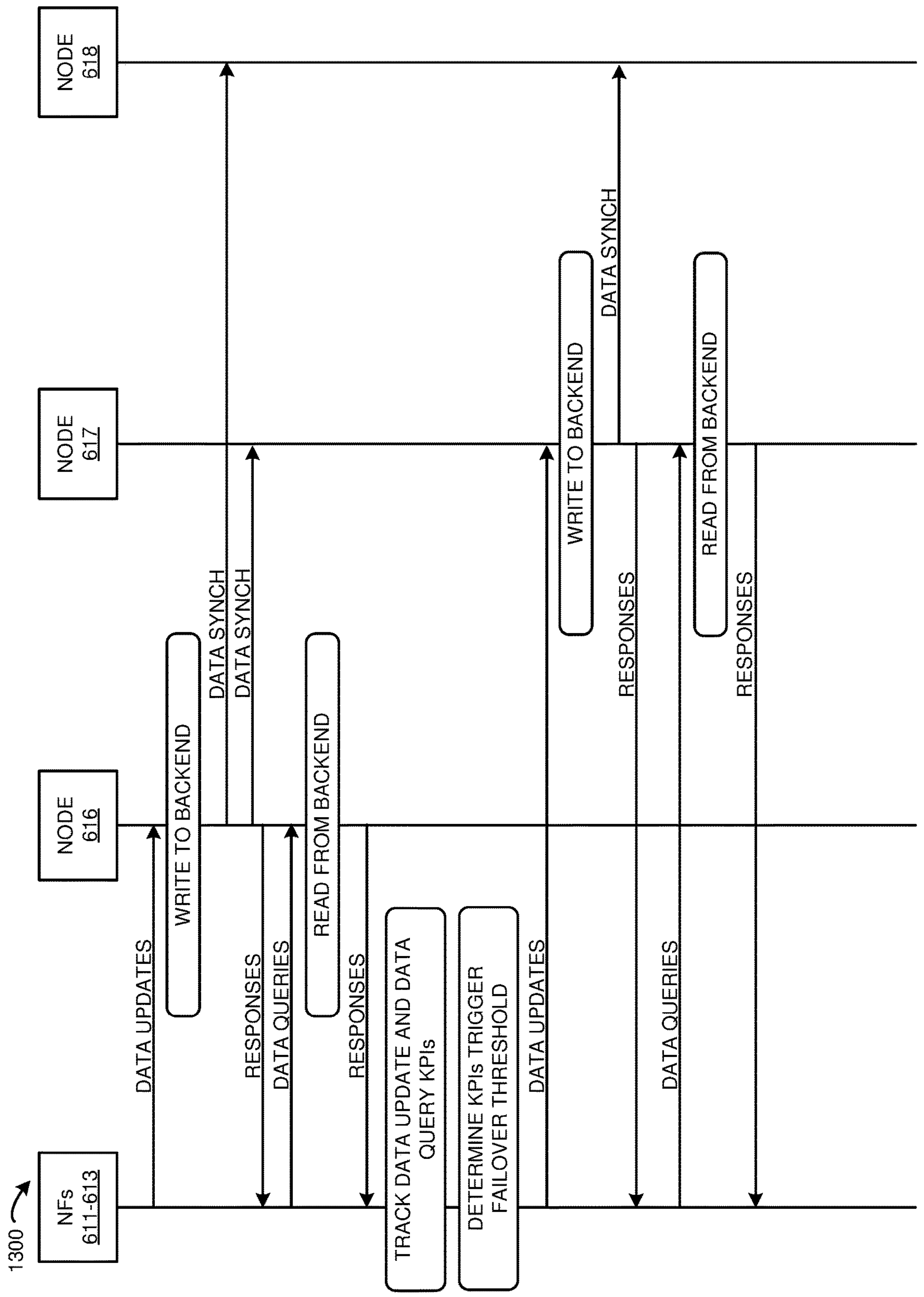
FIG. 13 illustrates an exemplary operation of the 5G wireless communication network to inhibit network data system signaling overload.

FIG. 13 illustrates process 1300. Process 1300 comprises exemplary operations of 5G wireless communication network 600 to inhibit network data system signaling overload. In some examples, network functions 611-613 transfer data updates to primary node 616. Node 616 writes the updates to its backend and transfers synchronization commands to secondary nodes 617 and 618. Node 616 fails to write a portion of responses to the backend (e.g., due to request timeouts). Node 616 transfers responses to network functions 611-613 indicating when the responses were successfully written to the backend. Network functions 611-613 transfer data queries to node 616. Node 616 reads the requested data from the backend and returns the requested data to network functions 611-613. Node 616 fails to respond with a portion of the requested data.

Network functions 611-613 track KPIs for primary node 616 that indicate the update and query success rates. Network functions 611-613 determine the success rate KPIs trigger a failover threshold (e.g., the data update success rate is too low). Network functions 611-613 failover to secondary node 617. Functions 611-613 transfer subsequent data updates to secondary node 617. Secondary node 617 writes the updates to the backend and transfers a synchronization command to node 618. Node 617 transfers responses to network functions 611-613 indicating the updates were successful. Functions 611-613 transfer subsequent data queries to secondary node 617. Secondary node 617 returns the requested data to network functions 611-613.

The wireless data network circuitry described above comprises computer hardware and software that form special-purpose network circuitry to inhibit network data system signaling overload. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to inhibit network data system signaling overload.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to inhibit network data system signaling overload, the method comprising:

a primary Unified Data Registry (UDR) node of a UDR detecting a fault condition for a secondary UDR node of the UDR;

the primary UDR node blacklisting the secondary UDR node for inter-UDR synchronization communications based on the fault condition and updating a network topology graph to remove the secondary UDR node;

the primary UDR node transferring a command to another secondary UDR node of the UDR to blacklist the secondary UDR node and to update the network topology graph to remove the secondary UDR node; and the other secondary UDR node receiving the command, blacklisting the secondary UDR node for the inter-UDR synchronization communications, and updating the network topology graph to remove the secondary UDR node.

2. The method of claim 1 further comprising:

the primary UDR node determining the fault condition for the secondary UDR node no longer exists;

in response to determining the fault condition no longer exists, the primary UDR node whitelisting the secondary UDR node for the inter-UDR synchronization communications and updating the network topology graph to add the secondary UDR node;

the primary UDR node transferring an additional command to the other secondary UDR node to whitelist the secondary UDR node and to update the network topology graph to add the secondary UDR node; and the other secondary UDR node receiving the additional command, whitelisting the secondary UDR node for the inter-UDR synchronization communications, and updating the network topology graph to add the secondary UDR node.

3. The method of claim 2 wherein the inter-UDR synchronization communications comprise at least one of a data query and a data update.

4. The method of claim 1 wherein the primary UDR node detecting the fault condition for the secondary UDR node comprises the primary UDR node detecting a connectivity issue between the primary UDR node and the secondary UDR node and responsively detecting the fault condition.

5. The method of claim 1 wherein the primary UDR node detecting the fault condition for the secondary UDR node comprises:
- the secondary UDR node detecting the fault condition and responsively transferring a notification to the primary UDR node indicating the fault condition; and
- the primary UDR node receiving the notification and detecting the fault condition for the secondary UDR node based on the notification.

6. The method of claim 5 wherein the secondary UDR node detecting the fault condition comprises:
- the secondary UDR node determining when Central Processing Unit (CPU) utilization exceeds a utilization threshold for a threshold period of time; and
- when the CPU utilization exceeds the utilization threshold for the threshold period of time, the secondary UDR node detecting the fault condition.

7. The method of claim 5 wherein the secondary UDR node detecting the fault condition comprises:
- the secondary UDR node determining when memory utilization exceeds a utilization threshold for a threshold period of time; and
- when the memory utilization exceeds the utilization threshold for the threshold period of time, the secondary UDR node detecting the fault condition.

8. The method of claim 5 wherein the secondary UDR node detecting the fault condition comprises:
- the secondary UDR node determining when a hardware failure occurs; and
- when the hardware failure occurs, the secondary UDR node detecting the fault condition.

9. The method of claim 1 further comprising:
- a network function determining when Key Performance Indicators (KPIs) for the secondary UDR node exceed a KPI threshold;
- when the KPIs exceed the KPI threshold, the network function determining to failover from the secondary UDR node to the primary UDR node; and wherein:
- the network function comprises one of a Unified Data Management (UDM), an Access and Mobility Management Function (AMF), or a Policy Control Function (PCF).

10. A wireless communication network to inhibit network data system signaling overload, the wireless communication network comprising:
- a Unified Data Registry (UDR) comprising a primary UDR node, a secondary UDR node, and another secondary UDR node;
- the primary UDR node configured to:
  - detect a fault condition for the secondary UDR node;
  - blacklist the secondary UDR node for inter-UDR synchronization communications based on the fault condition;
  - update a network topology graph to remove the secondary UDR node; and
  - transfer a command to the other secondary UDR node to blacklist the secondary UDR node and to update the network topology graph to remove the secondary UDR node; and
- the other secondary UDR node configured to:
  - receive the command;
  - blacklist the secondary UDR node for the inter-UDR synchronization communications; and
  - update the network topology graph to remove the secondary UDR node.

11. The wireless communication network of claim 10 wherein:
- the primary UDR node is further configured to:
  - determine the fault condition for the secondary UDR node no longer exists;
  - in response to determining the fault condition no longer exists, whitelist the secondary UDR node for the inter-UDR synchronization communications;
  - update the network topology graph to add the secondary UDR node;
  - transfer an additional command to the other secondary UDR node to whitelist the secondary UDR node and to update the network topology graph to add the secondary UDR node; and
- the other secondary UDR node is further configured to:
  - receive the additional command;
  - whitelist the secondary UDR node for the inter-UDR synchronization communications; and
  - update the network topology graph to add the secondary UDR node.

12. The wireless communication network of claim 11 wherein the inter-UDR synchronization communications comprise at least one of a data query and a data update.

13. The wireless communication network of claim 10 wherein the primary UDR node is configured to detect a connectivity issue between the primary UDR node and the secondary UDR node to detect the fault condition.

14. The wireless communication network of claim 10 wherein:
- the secondary UDR node is further configured to detect the fault condition and responsively transfer a notification to the primary UDR node indicating the fault condition; and
- the primary UDR node is configured to receive the notification and detect the fault condition for the secondary UDR node based on the notification.

15. The wireless communication network of claim 14 wherein the secondary UDR node is further configured to:
- determine when Central Processing Unit (CPU) utilization exceeds a utilization threshold for a threshold period of time; and
- detect the fault condition when the CPU utilization exceeds the utilization threshold for the threshold period of time.

16. The wireless communication network of claim 14 wherein the secondary UDR node is further configured to:
- determine when memory utilization exceeds a utilization threshold for a threshold period of time; and
- detect the fault condition when the memory utilization exceeds the utilization threshold for the threshold period of time.

17. The wireless communication network of claim 14 wherein the secondary UDR node is further configured to:
- determine when a hardware failure occurs; and
- detect the fault condition when the hardware failure occurs.

18. The wireless communication network of claim 10 further comprising:

a network function configured to:

determine when Key Performance Indicators (KPIs) for the secondary UDR node exceed a KPI threshold;

when the KPIs exceed the KPI threshold, the network function determining to failover from the secondary UDR node to the primary UDR node; and wherein:

the network function comprises one of a Unified Data Management (UDM), an Access and Mobility Management Function (AMF), or a Policy Control Function (PCF).

19. One or more non-transitory computer readable storage media having program instructions stored thereon to inhibit network data system signaling overload, wherein the program instructions, when executed by a computing system, direct the computing system to perform operations, the operations comprising:

detecting a fault condition for a secondary Unified Data Registry (UDR) node of a UDR;

blacklisting the secondary UDR node for inter-UDR synchronization communications based on the fault condition;

updating a network topology graph to remove the secondary UDR node; and transferring a command to another secondary UDR node of the UDR to blacklist the secondary UDR node and to update the network topology graph to remove the secondary UDR node, wherein the other secondary UDR node receives the command, blacklists the secondary UDR node for the inter-UDR synchronization communications, and updates the network topology graph to remove the secondary UDR node.

20. The one or more computer readable storage media of claim 19 wherein the operations further comprise:

determining the fault condition for the secondary UDR node no longer exists;

in response to determining the fault condition no longer exists:

whitelisting the secondary UDR node for the inter-UDR synchronization communications; and updating the network topology graph to add the secondary UDR node; and transferring an additional command to the other secondary UDR node to whitelist the secondary UDR node and to update the network topology graph to add the secondary UDR node wherein the other secondary UDR node receives the additional command, whitelists the secondary UDR node for the inter-UDR synchronization communications, and updates the network topology graph to add the secondary UDR node.

* * * * *